United States Patent

[11] 3,582,216

| [72] | Inventors | William R. Edwards<br>California, Md.;<br>Luther Peterson, Maitland, Fla.; Thomas Kelly, San Juan, P.R. |
|---|---|---|
| [21] | Appl. No. | 753,041 |
| [22] | Filed | Aug. 15, 1968 |
| [45] | Patented | June 1, 1971 |
| [73] | Assignee | The United States of America as represented by the Secretary of the Navy |

[54] DEVICE FOR MEASURING THE DISTANCE BETWEEN TWO PARALLEL LINES
10 Claims, 5 Drawing Figs.

[52] U.S. Cl. ................................................ 356/169, 33/1 C, 356/171
[51] Int. Cl. ........................................................ G01b 11/04
[50] Field of Search .......................................... 33/1 C, 1 HH, 158, 143; 356/32, 3, 156, 159, 169, 171

[56] References Cited
UNITED STATES PATENTS

| 2,363,964 | 11/1944 | Howson et al. .............. | 356/32 |
| 2,754,719 | 7/1956 | Chambrier .................. | 33/1 (C) UX |
| 3,301,124 | 1/1967 | Amery ........................ | 33/1 (HH) UX |

*Primary Examiner*—Ronald L. Wibert
*Assistant Examiner*—F. L. Evans
*Attorneys*—Thomas O. Watson, Jr. and R. S. Sciascia

ABSTRACT: An optical device for measuring distances consisting of a fixed prism and two movable prisms. The movable prisms are driven relative to the fixed prism by means of a rack and pinion. A calibrated dial coupled with the pinion records the distance the prisms have moved.

PATENTED JUN 1 1971 3,582,216

DEVICE FOR MEASURING THE DISTANCE BETWEEN TWO PARALLEL LINES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention is directed to an instrument for measuring the distance between two points. The invention is particularly useful for measuring the distance between parallel lines drawn between two points on a flat surface, i.e., two points on a piece of graph paper. The instrument, however, has utility in all instances where it is desired to measure the distance between two points or two parallel lines on a flat surface.

The invention is also uniquely adapted for measuring the distance between two electric events scribed on a recorder having a linearly movable chart and three equally spaced scribing pens. This type of recorder is commonly employed when triangulation methods are used to locate an object.

2. Description of the Prior Art

The prior art method of measuring the distance between parallel lines drawn through two points generally required the use of drafting dividers and a straight-edge ruler. One arm of the dividers was placed on a point and the other arm was rotated until it traced a circle to which the line drawn through the second point was tangential. This distance was then transposed to a ruler for measurement. L-shaped rulers have also been utilized.

The use of dividers involves a double measurement and, therefore, inherently increases the probability of error. The use of dividers, however, is generally more accurate than the use of an L-shaped ruler. In the use of an L-shpaed ruler, it is critical for an accurate measurement that the horizontal leg of the ruler be exactly parallel to the line drawn through the first point and experience shows that this is often not done.

Both prior art methods are subject to the probability of error inherent under poor lighting conditions.

SUMMARY OF THE INVENTION

The present invention represents a substantial improvement over the prior art. The distance between the parallel lines drawn through two points can be obtained with a single measurement. The use of prisms increases accuracy not only because of their light-gathering qualities but also because a 45° line of sight bending can be obtained.

The narrowness of the ground lines that can be obtained by use of a prism are yet another advantage of the present invention. These ground lines are laid along the parallel lines or as in the case of the aforementioned recorder equipment, the ground lines are laid directly over each recorded electrical event. The narrowness of the ground lines increases the probability that the instrument will be properly aligned and allows for accuracy of measurements within one sixty-fourth of an inch.

A still further advantage of the present invention lies in the fact that the distance can be read directly from a dial. This minimizes the possibility of a reading error.

The instrument contemplated by the present invention utilizes two prisms movable in relation to a third prism. The ground line of the third prism is centered at the first point on the parallel line drawn through it. The instrument is then pressed downward and held in place by means of detents attached to the prism. The two movable prisms are attached to a rack which is moved by a pinion. A measurement dial is attached to the pinion and turns with it. The ground lines of the two movable prisms are then centered on the parallel line drawn through the second point. The distance between the two lines is read off the dial.

Other objects, advantages and novel features of the present invention will become apparent from the following detailed description of the invention when considered in conjunction with the accompanying drawings.

DESCRIPTION OF THE PREFERRED EMBODIMENTS

Figure 1:
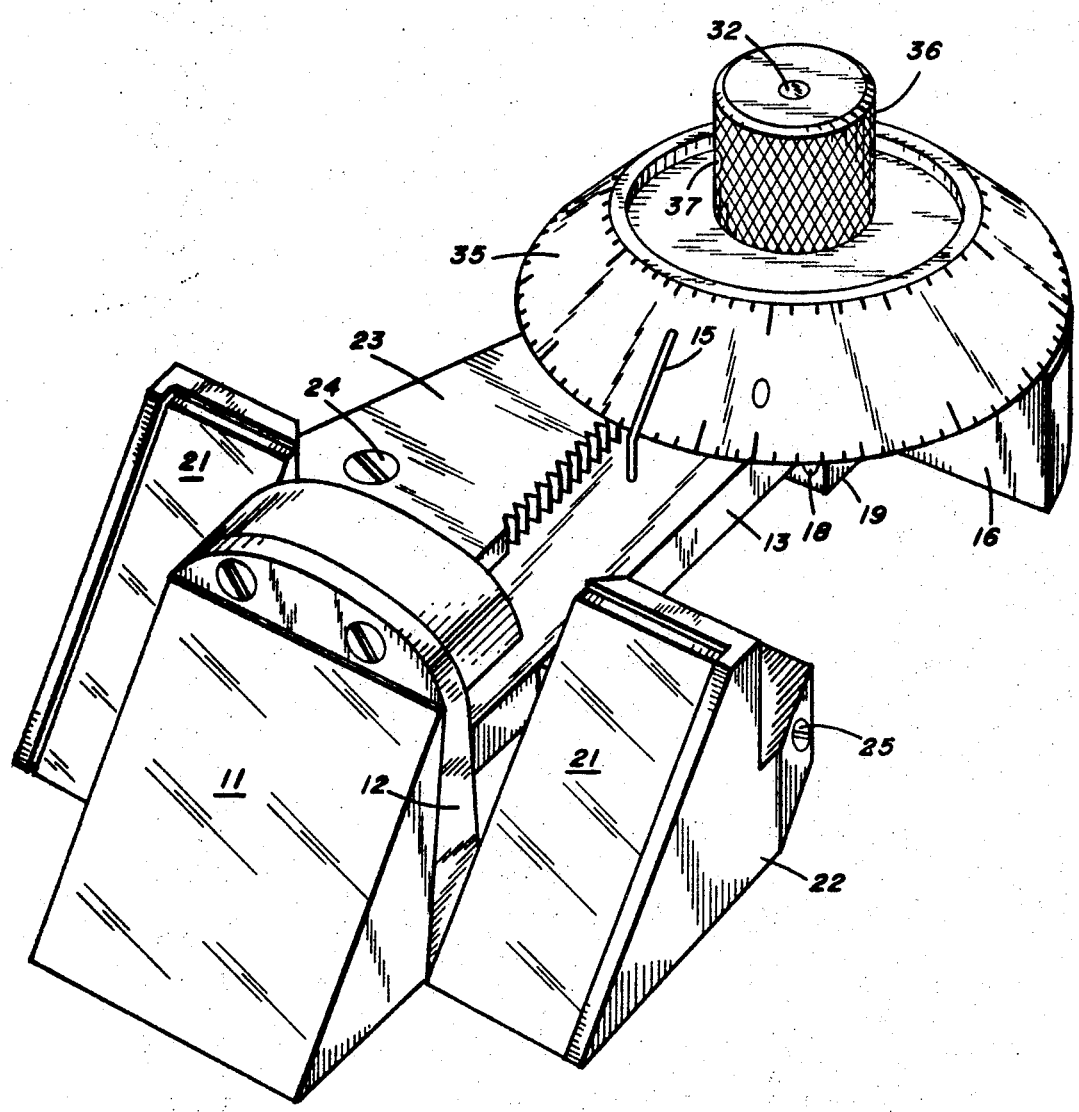
FIG. 1 is an isometric view of the invention.

Referring to the drawings, the measuring instrument of this invention utilizes three prisms. Prism 11 is mounted on support 12 and rigidly attached to arm member 13 by screws 17. Prisms 21 are mounted on support 22 which is attached to rack 23 by screws 24. The center of support 22 has a groove into which support 12 and arm 13 fit. Support 22 has a hole which is drilled through it to the groove. Tension means 25 consisting of a ball, spring and adjustment screw are fitted into the hole and hold arm 13 in slidable engagement with support 22.

When support 12 is pressed down on a flat surface, prism 11 is held in place by means of detents 14. Rack 24 and block 23 move prisms 21 in slidable relation with prism 11.

Block 16 is grooved and serves as a guide for the rack. It is attached to arm 13 and detent 14 by means of screws 18.

Figure 2:
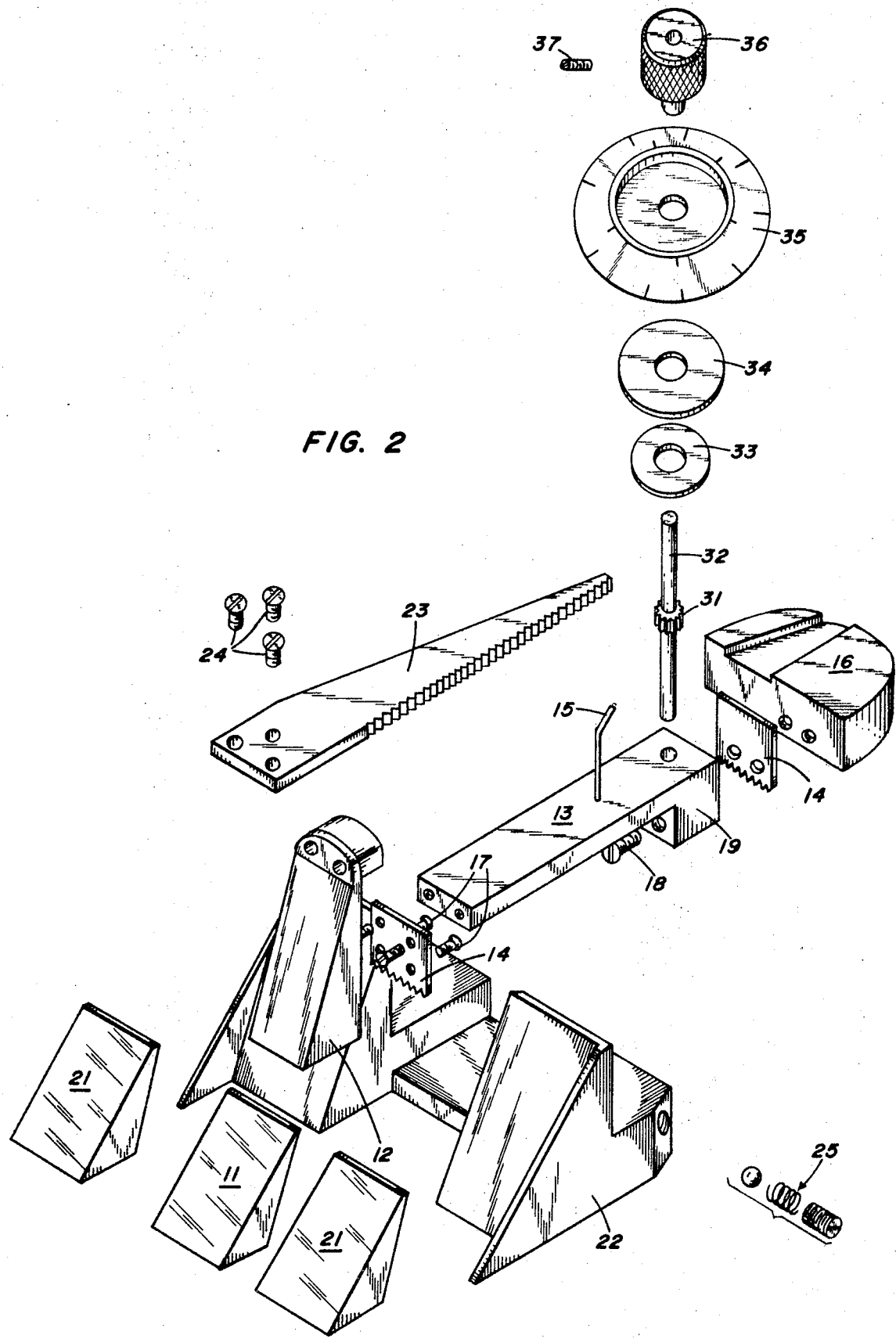
FIG. 2 is an assembly drawing of the invention.

The mechanism for moving the rack comprises pinion 31, shaft 32 and knob 36 (FIG. 2). The shaft 32 rotates in a hole 19 in arm 13. Hole 19 is adjacent to rack 23. Pinion 31 is mounted on shaft 32 and engages rack 23. Knob 36 is attached to the top of shaft 32 by setscrew 37 and is operable to rotate the shaft. The knob has a sleeve which extends over the shaft. The distance through which prisms 21 move is recorded by dial 35. The dial which engages the sleeve of knob 36 has a frustoconical shape and is held off the surface of rack 32 and block 16 by means of collar 33. Friction disc 33 binds dial 35 to the sleeve of knob 36 so that the dial moves with the knob and pinion.

Figure 4:
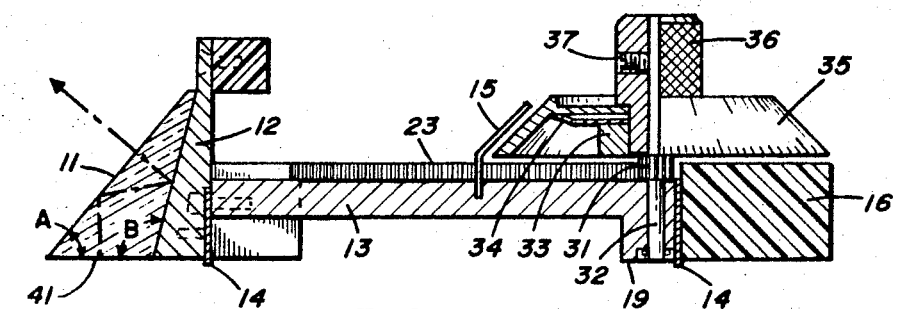
FIG. 4 is a partial sectional side view of the invention taken along line 4–4 of FIG. 3.
Figure 5:
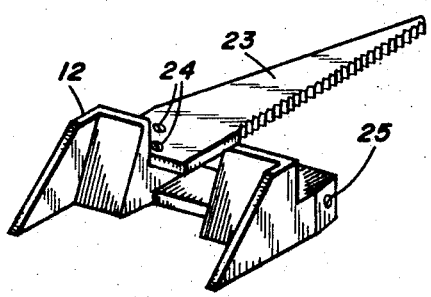
FIG. 5 shows the rack and movable block of the invention.

Referring more particularly to FIG. 4, the instrument uses three identical prisms. The prisms are polished on all sides to increase their light-gathering quality and provide kaleidoscope enhancement. Angles A and B of the prisms are selected to give an approximate 45° line of sight. Angle A is 50° 30' and Angle B is 103° 50'. The fiduciary line 41 of the prism which is ground in the base is approximately 0.008 inches thick and is filled with black paint. The back of each prism which engages the support is coated with reflecting material. The image detected at the fiduciary line is internally reflected two times before it is projected at the front of the prism (FIG. 4). The supports 12 and 22 are cut to the complement of Angle B of the prisms and the prisms are attached to the supports by adhesive or the like.

Figure 3:
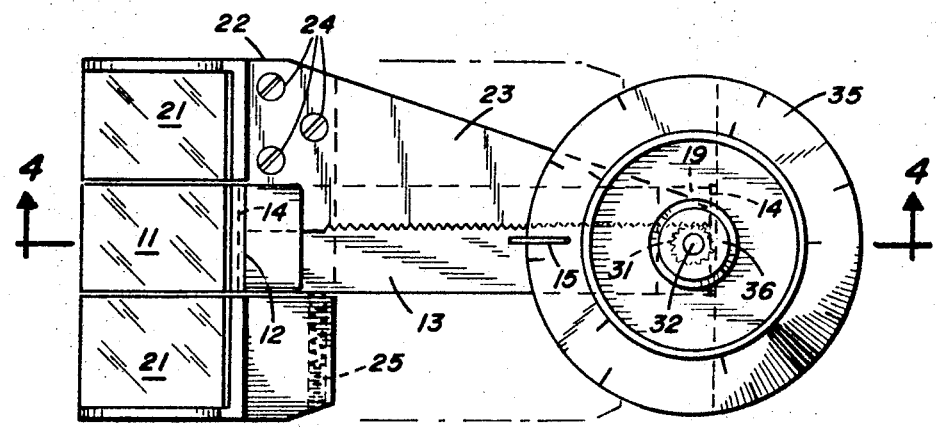
FIG. 3 is a plane view of the invention.

In operation, the instrument is first placed on a flat surface. The knob 36 is moved until pointer 15 is over the zero point of dial 35. At this position the three prisms are level with each other (FIG. 3) and their three fiduciary lines from a single straight line. The stationary prism 11 is centered on the first point and its fiduciary line is placed over the line which intersects the point. Support 12 of the instrument is then pressed down and detent 14 holds the instrument in place. Knob 36 is then turned and pinion 31 moves rack 23 and prisms 21 to the rear of the fixed prism. Prisms 21 are moved until their fiduciary lines are over the line drawn through the second point which is parallel to the first line.

In use with the aforementioned triangulation recorder, the instrument is designed such that when the fixed prism is centered on the recording of the middle pen, the movable prisms will each be centered over the recordings of the other two pens. Thus, when a first electrical event is scribed by one pen, and a second electrical pen event is subsequently scribed by another pen, the third prism 11 is centered on the first event and in two out of three possible combinations one of the movable prisms 21 will be centered on the other event. This arrangement enables the operator of the instrument to achieve a highly accurate placement of the prisms for the majority of the measurements taken.

The points between which this instrument measures are normally scribed on graph paper and the lines on the paper serve as the parallel lines through the points between which measurements are taken. However, unlined paper may be used if parallel bars are used to draw parallel lines through the points in question.

The dial may read the distances between the points in any unit of measure scribed thereon. If, for example, the paper on which the points are scribed has a time base, the distance may be read out in units of time.

It should be understood that the foregoing disclosure relates to only a preferred embodiment of the invention and that many modifications or alterations may be made without departing from the spirit and scope of the invention as set forth in the appended claims.

What we claim is:

1. An instrument for measuring the transverse distance between two parallel lines comprising:
    a first prism having a fiduciary line;
    an arm on which said first prism is mounted;
    means extending from said arm for maintaining said arm and said first prism stationary relative to a line bearing medium with the fiduciary line of said first prism overlying one of said parallel lines;
    a second prism having a fiduciary line and movable in relation to said first prism;
    means connected to said second prism and said arm for moving said second prism in relation to said first prism such that the fiduciary line of said second prism overlies the other of said parallel lines; and
    indicating means connected to said moving means for indicating the distance said moving means moves said second prism which is the transverse distance between the said two parallel lines.

2. An instrument for measuring the distance between two parallel lines as described in claim 1 wherein said means for moving said second prism includes
    a rack attached to said second prism; and
    a pinion adjacent to and in mating relationship with said rack.

3. An instrument for measuring the distance between two parallel lines as in claim 2 wherein said means for moving said second prism further includes
    a shaft concentrically connected to said pinion and rotatably mounted in said arm; and
    a knob connected to said shaft and operable to rotate it.

4. An instrument for measuring the distance between two parallel lines as in claim 3 further comprising
    a guide for said rack;
    said guide being rigidly attached to said arm.

5. An instrument for measuring the distance between two parallel lines as in claim 4 further comprising
    a grooved support on which said second prism is mounted;
    said rack being attached to said grooved support.

6. An instrument for measuring the distance between two parallel lines as in claim 5 wherein
    said first prism is mounted on the front of said arm;
    said guide is mounted on the back of said arm; and
    said shaft is mounted in said arm adjacent to said guide.

7. An instrument for measuring the distance between two parallel lines as in claim 6 wherein
    said rack moves in slidable engagement with said arm;
    said pinion is operable to move said rack forward or backward; and
    the fiduciary lines of said first and second prisms are contiguous when said rack is in its forwardmost position.

8. An instrument for measuring the distance between two parallel lines as in claim 7 further comprising
    a third prism having a fiduciary line;
    said third prism being attached to said support such that first prism lies between said second and third prism and the fiduciary lines of the three prisms are contiguous when said rack is in its forwardmost position.

9. An instrument for measuring the distance between two parallel lines as in claim 8 wherein each of said prisms is ground to provide 45° line of sight bending of said fiduciary line.

10. An instrument for measuring the distance between two parallel lines as in claim 9 further comprising means for adjusting the force with which said arm engages said mount.